(12) United States Patent
Floersheimer et al.

(10) Patent No.: US 6,494,483 B2
(45) Date of Patent: Dec. 17, 2002

(54) AIRBAG MODULE

(75) Inventors: Stefan Floersheimer, Floersheim (DE); Stefan Jost, Eppstein (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/778,965

(22) Filed: Feb. 8, 2001

(65) Prior Publication Data

US 2001/0026065 A1 Oct. 4, 2001

(30) Foreign Application Priority Data

Apr. 28, 2000 (DE) .......................................... 100 20 929

(51) Int. Cl.[7] ................................................ B60R 21/28
(52) U.S. Cl. ........................................ 280/740; 280/741
(58) Field of Search ............................ 280/728.2, 731, 280/740, 741, 736, 743.1

(56) References Cited

U.S. PATENT DOCUMENTS

| | | | |
|---|---|---|---|
| 3,778,085 A | 12/1973 | Lipkin | |
| 3,819,205 A * | 6/1974 | Dunford et al. | 200/61.55 |
| 4,913,461 A * | 4/1990 | Cuevas | 280/731 |
| 5,013,064 A * | 5/1991 | Miller et al. | 280/730.1 |
| 5,452,913 A | 9/1995 | Hansen et al. | 280/728.2 |
| 5,564,742 A * | 10/1996 | Clark et al. | 280/740 |
| 5,577,766 A * | 11/1996 | Niwa et al. | 200/61.54 |
| 5,887,892 A * | 3/1999 | Burdack et al. | 280/728.3 |
| 5,988,677 A * | 11/1999 | Adomeit et al. | 280/736 |
| 5,992,874 A | 11/1999 | Sugiyama et al. | 280/728.2 |
| 5,997,029 A | 12/1999 | Miltenberger | |
| 6,059,312 A * | 5/2000 | Staub et al. | 280/729 |
| 6,095,549 A * | 8/2000 | Adomeit et al. | 280/728.2 |
| 6,109,649 A * | 8/2000 | Adomeit et al. | 280/740 |
| 6,161,865 A * | 12/2000 | Rose et al. | 280/728.2 |

FOREIGN PATENT DOCUMENTS

| | | | | |
|---|---|---|---|---|
| DE | 4442202 | | 5/1996 | |
| DE | 019806773 | * | 3/1998 | 280/728.1 |
| DE | 19645217 | | 5/1998 | |
| DE | 19720149 | | 11/1998 | |
| DE | 29902275 | | 6/1999 | |
| DE | 19824735 | | 12/1999 | |
| DE | 019949481 | * | 4/2001 | 280/728.1 |
| EP | 0811531 | | 5/1997 | |
| JP | 04287745 | | 10/1992 | |
| JP | 08011659 | | 1/1996 | |
| JP | 00190802 | * | 7/2000 | 280/728.1 |
| JP | 00211465 | * | 8/2000 | 280/728.1 |

* cited by examiner

Primary Examiner—Paul N. Dickson
Assistant Examiner—Toan C To
(74) Attorney, Agent, or Firm—Jarrett Rieger; Lonnie Drayer

(57) ABSTRACT

An airbag module has an airbag and a gas generator. A supporting element is arranged between the gas generator and the airbag in the direction of deployment of the airbag such that, when folded, a portion of the airbag which is at the front in the direction of deployment rests essentially flat against a front surface of the supporting element.

13 Claims, 10 Drawing Sheets

AIRBAG MODULE

FIELD OF THE INVENTION

The invention relates to an airbag module, in particular an airbag module for installation on the front passenger side of a motor vehicle.

BACKGROUND OF THE INVENTION

Hitherto, front passenger airbag modules have generally been installed in motor vehicles such that they are covered by a solid part of the interior trim of a motor vehicle. Particularly in the case of front passenger airbag modules that require a large outlet opening, a sturdy cover over the airbag module is necessary to protect the airbag module from damage. A cover of such sturdiness is required to give the interior trim of the motor vehicle, e.g. the instrument panel, the necessary shape and strength. These solid covers are generally designed as one or multi-part flaps that open when the airbag is deployed. During this process, a film that forms the surface of the interior trim and is arranged over the flaps tears at predetermined tearing points. This allows the airbag to deploy into the vehicle interior.

This arrangement has the disadvantage that relatively large forces are required to open the rigid flaps, and this requires a high internal pressure in the airbag before the opening of the flaps. A comparatively long time is needed to build up this required high internal pressure by the gas generator, and this leads to slower deployment of the airbag. The full protective effect of the airbag is therefore delayed. Particularly in what are referred to as "out-of-position" cases, however, in which a vehicle occupant is too close to the instrument panel support, very rapid and gentle deployment of the airbag is desired to avoid or minimize injuries to the vehicle occupant. The opening of the flaps also represents an additional risk of injury.

Further, in these known airbag modules, the folded airbag is arranged above or around the gas generator. When the airbag is deployed the gas pressure produced by the gas generator starts inflating the airbag and the airbag is substantially at once ejected from the housing before the airbag is completely inflated. This represents a further risk of injury in particular in "out-of-position" cases, since parts of the folded airbag are ejected with a high velocity without unfolding at the same time and may hit the vehicle occupant. In the worst case, in particular if the occupant is situated very close to the airbag module, the vehicle occupant may be hit by the complete packet of the folded airbag which is ejected with a high velocity out of the housing of the airbag module. Further, if the airbag is not completely inflated it does not have the required internal pressure and is not taut enough to provide a sufficient protective effect in particular in an "out-of-position" case.

SUMMARY OF THE INVENTION

There is provided in accordance with the present invention an airbag module that allows more rapid and gentler deployment of the airbag. The airbag module has a sturdy surface and forms an additional impact protector, particularly with a view to meeting the requirements of European regulation ECE R 21/Head Impact.

The airbag module of the present invention has an airbag and a gas generator. A supporting element is arranged in such a way between the gas generator and the airbag in the direction of deployment of the airbag that, when folded, a portion of the airbag which is at the front in the direction of deployment rests essentially flat against a front surface of the supporting element.

DETAILED DESCRIPTION OF THE INVENTION

Figure 1:
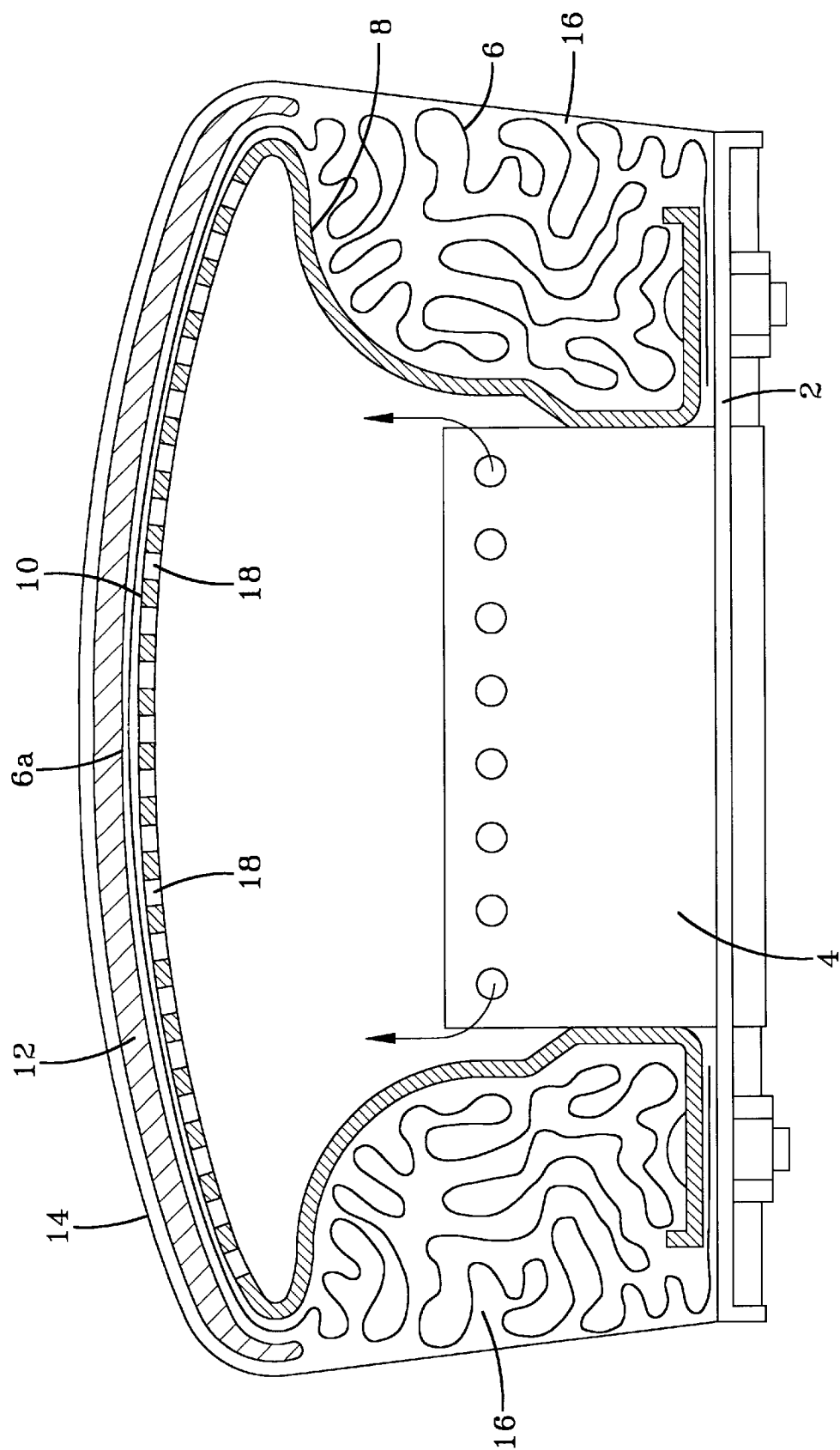
FIG. 1 is a cross section through an airbag module according to the invention.

Like known airbag modules, the airbag module shown in FIG. 1 comprises a gas generator support or holding plate with a gas generator 4 secured thereon, and an airbag 6. The airbag module has a supporting element 8 that surrounds the gas generator 4 and widens in a mushroom shape, starting from the gas generator. The folded airbag is thus arranged around the tapered part of the supporting element. In this way, the folded airbag is well protected by the supporting element above it. In this arrangement a front surface 10 of the supporting element faces the interior of the vehicle, in the direction in which the airbag 6 is deployed. The airbag is secured between the gas generator support 2 and the supporting element in the region of the gas inlet opening of the airbag. This provides a sturdy airbag module that can be installed in a motor vehicle without further assembly steps. This ensures that the supporting element does not become detached due to the gas pressure, which could represent an additional risk of injury for a vehicle occupant.

The folded airbag 6 is preferably arranged essentially laterally with respect to the gas generator 4, to the outside of the supporting element 8, and behind the front surface of the supporting element in the direction of deployment of the airbag.

A front portion or forward portion 6a of the airbag 6, which faces a vehicle occupant when the airbag is deployed, rests directly against that side of the front surface 10 which faces the vehicle interior. As used herein and in the claims the direction of deployment of an airbag is the direction in which the airbag moves toward a vehicle occupant as it is inflated.

There is only one layer of the folded airbag 6, namely the front portion 6a, in front of the supporting element 8 in the direction of deployment. This portion extends parallel to the surface of the supporting element and rests essentially fully against the latter. The remainder of the airbag, which is folded in an ordered or chaotic manner, is arranged behind the front surface of the supporting element. The supporting element supports the forward portion of the airbag from the rear, the said portion forming the front surface of the airbag module in the folded airbag, with the result that the airbag module has a sturdy front or outer surface. With this airbag module, it is not necessary to arrange solid covering elements, such as cover flaps, over the front side of the airbag module, which faces the vehicle interior, in order to obtain a sturdy surface for a vehicle's interior trim. The airbag module according to the invention can be integrated directly into a vehicle's interior trim without being arranged behind a sturdy cover. The supporting element can be elastically or plastically deformable in such a way that it has a damping effect if the airbag does not unfold when struck by a vehicle occupant.

Further, this design provides improved deployment of the airbag. Since only the front portion 6a of the airbag 6 is located above the supporting element 8, the front portion of the airbag is the part of the airbag that is ejected first when the airbag is deployed. The other parts of the airbag have to pass the sides of the supporting element and are unfolded and pulled out of the airbag module housing successively. Thus, during deployment the part of the airbag that has already left the housing forms a completely inflated cushion in front of, i.e. above the supporting member. Therefore, the airbag has a sufficient protective effect from the beginning of the deployment process and the risk of injuries because of folded and not inflated parts of the airbag ejected from the housing is minimized.

Preferably, the front surface 10 of the supporting element 8, against which the airbag 6 rests, extends essentially along the entire front side of the airbag module. As used herein and in the claims, the front side of the airbag module is that side of the airbag module that faces the interior of a motor vehicle. As used herein and in the claims, the front portion of the airbag is that portion which faces a vehicle occupant as the airbag is deployed. The front surface 10 of the supporting element 8 preferably covers the airbag module essentially completely, only a front portion of the airbag being arranged above the supporting element, i.e. being positioned toward the vehicle interior. Thus, the airbag module has a sturdy surface toward the vehicle interior forming the desired contour of a vehicle interior trim and protecting the airbag module from damage.

A foam layer 12 is arranged on the front surface 10 of the supporting element 8, above the forward portion 6a of the airbag 6, i.e. facing the vehicle interior. This foam layer provides additional damping to impacts if a vehicle occupant strikes the airbag module and the airbag is not deployed. This foam layer preferably corresponds to the foam material arranged under the surface of the remainder of the interior trim of the vehicle to give the surface a flexible, soft structure.

The foam layer 12 is covered by a cover layer 14, in particular in the form of a film or a fabric. The cover layer surrounds the entire airbag module and is secured on the periphery of the holding plate 2. This ensures good protection for the entire airbag module, particularly for the airbag 6. Alternatively, the cover layer can be adhesively bonded directly to the airbag in the forward portion of the latter. The cover layer moves toward a vehicle occupant together with the forward portion of the airbag as the airbag is deployed.

The cover layer 14 has a structure matched to the remainder of the vehicle interior trim, allowing it to be arranged directly as part of the vehicle interior trim without the need to arrange further covering elements, such as solid covering flaps, over the airbag module. This gives a seamless surface of the vehicle interior trim, even in areas in which airbag modules are arranged. Very rapid deployment of the airbag can nevertheless be assured since it is not arranged behind fixed cover flaps but is directly underneath the film or layer of material forming the surface of the vehicle interior trim. The foam layer 12 provides the surface of the airbag module with a certain damping property, ensuring additional protection in the event of impacts and providing a surface with a pleasant feel.

It is preferred that the supporting element 8 is designed as a cage that tapers from the front side of the airbag module to the gas generator 4 and surrounds the gas generator. In the lateral areas 16 that surround the tapered or narrower part of the supporting element 8 in the region of the gas generator 4, the airbag 6 is folded in a chaotic manner. The cage design of the supporting element thus essentially has a mushroom shape where the front surface of the supporting element covers the airbag module essentially completely toward the vehicle interior. The front surface 10 of the supporting element has a multiplicity of holes 18 which allow the gas produced by the gas generator 4 to pass through. Toward the rear, i.e. toward that end of the airbag module that faces away from the vehicle interior, the supporting element 8 tapers in such a way that it rests against the gas generator and preferably surrounds the latter snugly. This provides an additional assurance that gas produced by the gas generator can flow out only through the supporting element and preferably only through its gas permeable front surface, while gas outflow in other directions, especially rearward, is prevented.

Because the supporting element 8 is situated directly under the surface of the airbag module formed by the front portion 6a of the airbag 6, the foam layer 12 and the cover layer 14, the surface has sufficient strength to dispense with additional covering elements over the airbag module. The airbag module can be integrated directly and visibly into the vehicle's interior trim or can be mounted out of sight behind the surface. This ensures rapid deployment of the airbag 6 since there is no need for an additional solid covering element to open, something which would require a higher gas pressure to open the trim. This provides better protection for the vehicle occupants, especially in "out-of-position" cases, because the airbag is deployed more rapidly and more gently.

An airbag module according to the invention is suitable, in particular, for installation on the front passenger side of a motor vehicle since airbag modules of this kind are very large and require a large outlet opening. At the same time, however, the instrument panel support should be sufficiently sturdy and firm, this being effected by the supporting element 8. The supporting element is preferably designed in such a way that it can absorb energy within itself in order in this way to act as an additional impact protector, e.g. if the airbag is not deployed. For this purpose, the front surface can, for example, be slightly convex toward the vehicle interior.

To deploy the airbag 6, the gas generator 4 is activated, causing gas to flow from the gas generator into the interior of the supporting element 8 as indicated by arrows in FIG. 1. The gas flows through the holes 18 in the supporting element and drives the forward portion 6a of the airbag 6, the portion which rests against the front surface 10, in the direction of the vehicle interior.

Figure 2:
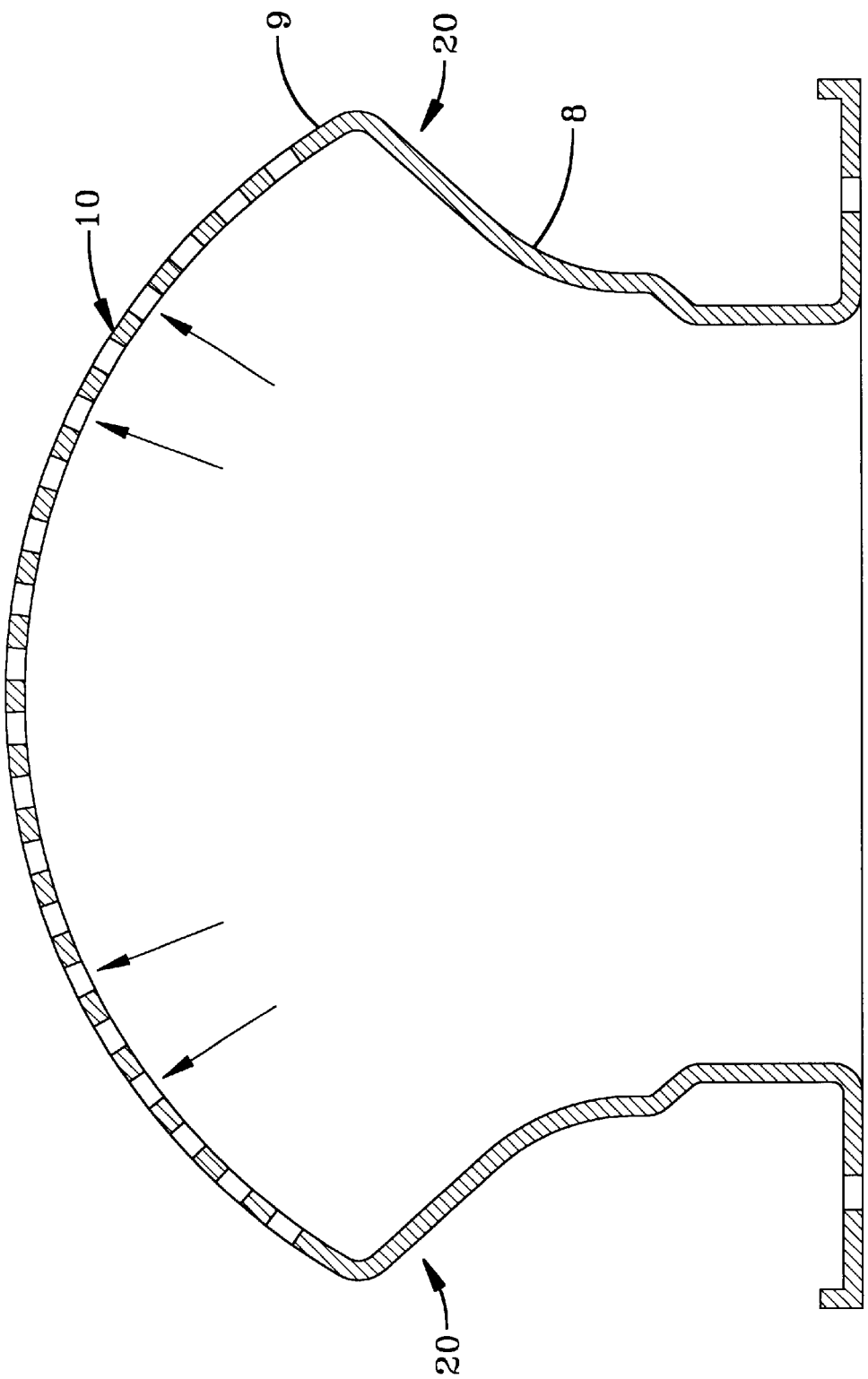
FIG. 2 is a cross section through a supporting element of the airbag module according to the invention in its bulging state.

In the process, the forward portion 6a of the airbag 6 presses against the foam layer 12 and the cover layer 14, the cover layer preferably being torn open along predetermined tear lines (not shown here), thus allowing the airbag to enter the vehicle interior unhindered. It is expedient if at least the front surface 10 of the supporting element 8 is designed to be deformable in such a way that, as the airbag is deployed, it bulges or arches in the direction of deployment of the latter and its radius of curvature decreases due to the gas pressure in its interior, as shown in FIG. 2. At the same time, the supporting element contracts at its circumference, i.e. the radius of curvature decreases, as indicated by the arrows 20 in FIG. 2. This allows the airbag 6, which is folded in the lateral areas 16, to move past the circumference of the supporting element 8 more easily since a larger free space has been created there. Rapid deployment of the airbag can thus be ensured. This deformation of the supporting element ensures that, with the airbag folded, the front surface of the supporting element almost completely covers the airbag module in the direction of the vehicle interior and, at the same time, that a gap, through which the airbag can be deployed unhindered, opens up at the circumference of the front surface 10 of the supporting element 8 as the airbag is deployed.

The supporting element 8 is preferably gas permeable at least at its front surface 10, in particular being designed in the form of a perforated plate. This configuration makes it possible for gas supplied by the gas generator 4 to flow through the supporting element with as little hindrance as possible to inflate the airbag. The perforated plate configuration can be produced at reasonable cost and provides a desirable deformability of the supporting element. It is possible, by carefully selected arrangement of openings or holes in the supporting element, for the gas flow to be guided in a desired direction. Instead of the configuration of the supporting element as a perforated plate, the supporting element can be produced from molded plastic with openings that allow the passage of the inflation gas.

Put another way, to deploy the airbag 6, gas generated by the gas generator 4 flows through the support element 8 and forces the layer forming the forward portion of the airbag out of the housing of the airbag module thereby tearing the cover layer 14 and the interior trim of the vehicle. Thus, the forward portion of the airbag is inflated first. During further deployment of the airbag, the forward portion is moved toward a vehicle occupant and away from the supporting element 8. The remainder of the airbag arranged behind the front surface of the supporting element is successively pulled out of the airbag module. The front surface of the supporting element prevents the folded airbag from being ejected at once, since the airbag has to pass the gap between the front surface of the supporting element and the surrounding parts of the airbag module or vehicle interior trim. The gap has a width that does not allow the folded airbag to pass therethrough, only a single layer of the airbag can pass through this gap. Thus, the airbag is successively inflated so that the parts of the airbag that have left the airbag module form a completely inflated cushion at any time during the process of deploying of the airbag.

Figure 3:
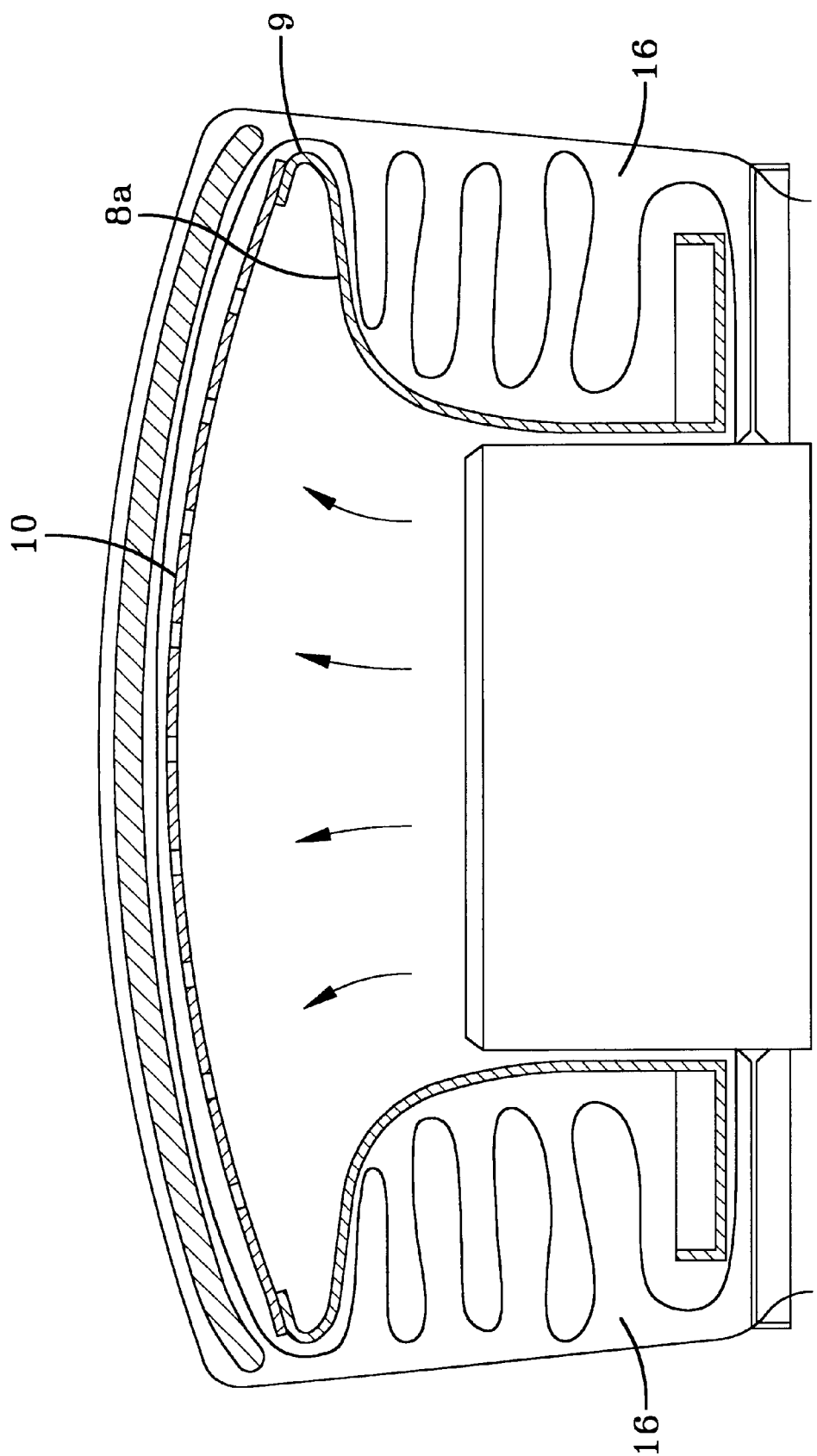
FIG. 3 is a cross section through the airbag module according to the invention in accordance with a second embodiment.

FIG. 3 shows a second embodiment of the airbag module according to the invention that corresponds essentially to the embodiment shown in FIG. 1. Only the differences with respect to the airbag module shown in FIG. 1 will be explained. In contrast to the embodiment shown in FIG. 1, in which the supporting element 8 is of one piece construction, the supporting element 8 in FIG. 3 is of two-part construction. It comprises the front surface 10 and a circumferential body 8a, which are preferably produced from sheet metal or plastic, are welded together along the circumference 9. Another difference with respect to the embodiment in FIG. 1 is that, in the lateral area 16, the airbag 6 is folded up in a regular "zigzag" pattern.

Figure 4:
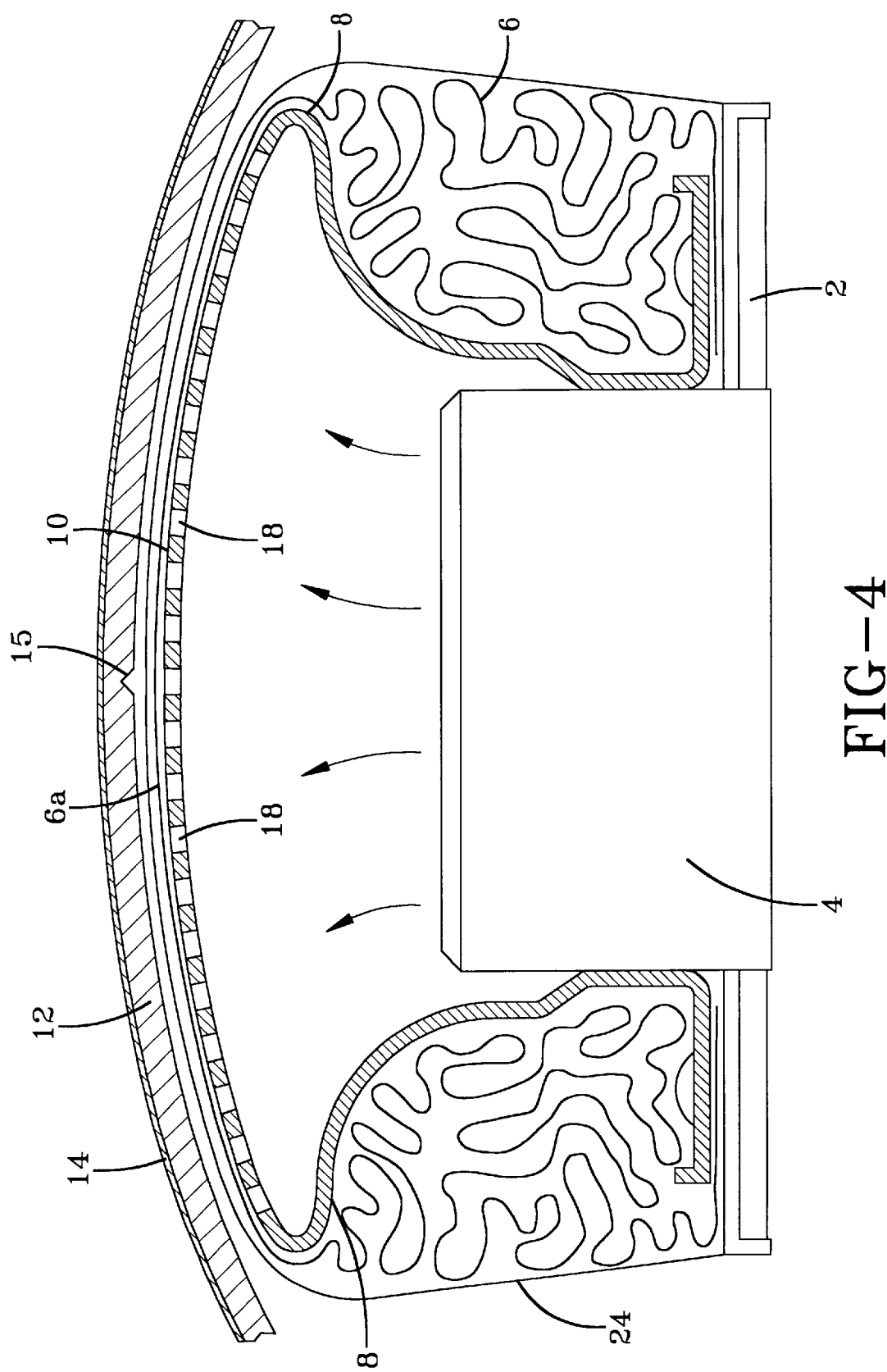
FIG. 4 is a cross section through the airbag module according to the invention in accordance with a third embodiment.
Figure 5:
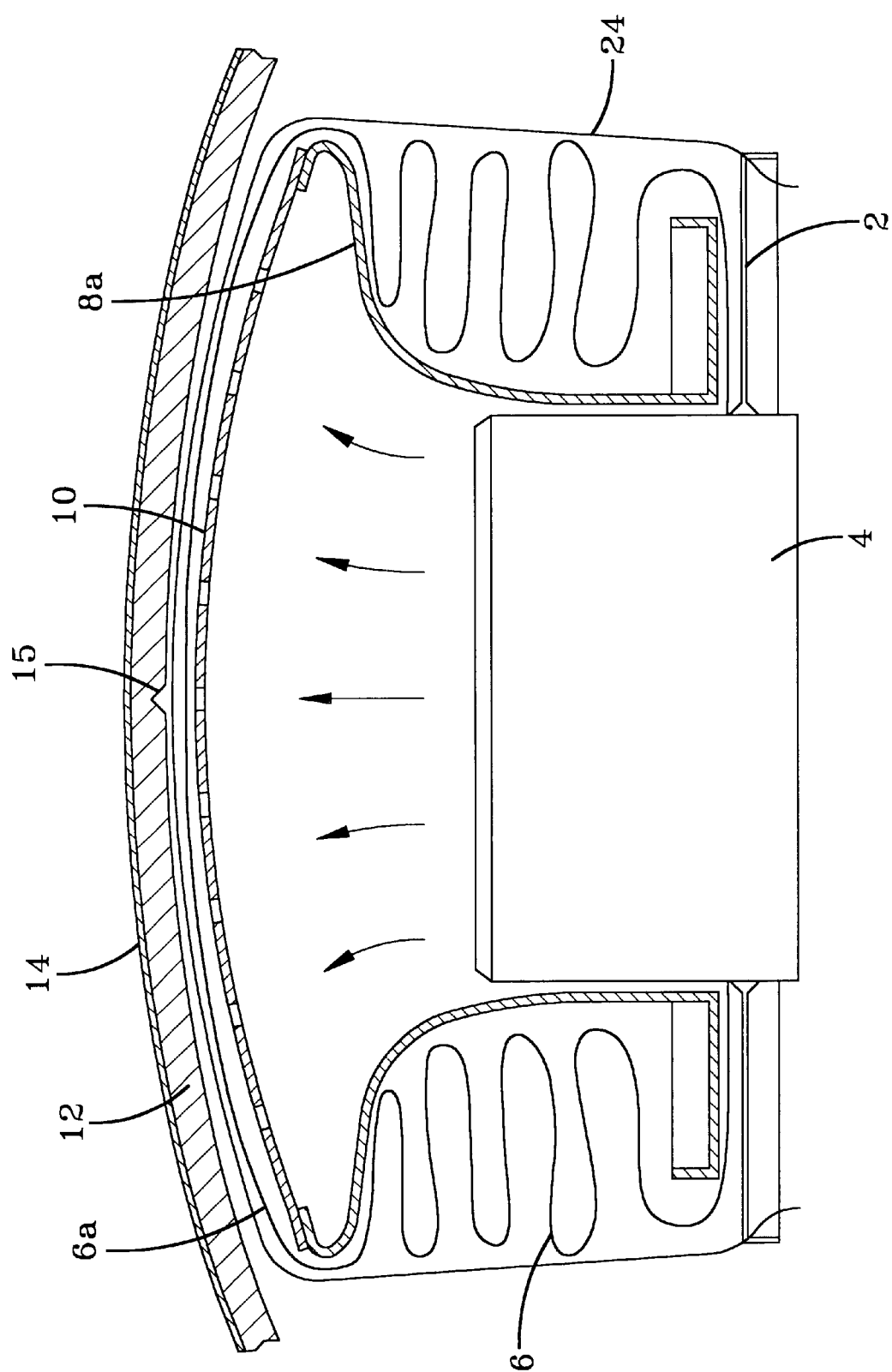
FIG. 5 is a cross section through the airbag module according to the invention in accordance with a fourth embodiment.

The airbag modules shown in FIGS. 4 and 5 correspond essentially to the embodiments shown in FIGS. 1 and 3. In contrast to the embodiments shown in FIGS. 1 and 3, the cover layer 14 and the foam layer 12, which form the boundary with respect to the vehicle interior, are not part of the airbag module in the case of the airbag modules in accordance with FIGS. 4 and 5 but are an integral part of the vehicle's interior trim. The airbag module is designed as a separate component and is arranged out of sight behind the cover layer 14 and the foam layer 12 of the interior trim. In contrast to this, the airbag modules shown in FIGS. 1 and 3 are provided as visible parts of the interior trim, which are inserted into a corresponding recess. The airbag modules in accordance with FIGS. 4 and 5 therefore have an additional sleeve 24, which is secured on the gas generator support 2 and surrounds and protects the entire airbag module. This sleeve 24 serves to protect the airbag module before and during installation in a vehicle. The sleeve can, for example, be cast in the form of a box shaped hood from a rubber like material, for example. It is expedient if predetermined tearing points are also provided in the sleeve, at which points the sleeve can tear open to allow the airbag to emerge.

The interior trim formed by the cover layer 14 and the foam layer 12, which may, for example, seamlessly cover a instrument panel support, has predetermined tearing points 15 in the region of the airbag module. These predetermined tearing points allow the cover layer to be torn open quickly when the airbag 6 is deployed and enters the vehicle interior quickly and without hindrance. The predetermined tearing points are preferably formed in an H shape in the cover layer, over the horizontal center. The cover layer tears in an H shape and folds to the sides in two flaps. However, the cover layer does not tear away completely, thus preventing injury to a vehicle occupant caused by flying parts of the cover layer. The cover layer and the foam layer tear significantly more easily than the solid flaps of the prior art since the materials involved in the case of the cover layer and the foam layer are light and flexible.

Otherwise, the airbag module shown in FIG. 4, like the airbag module in accordance with FIG. 1, has a chaotically folded airbag 6 and a one-piece supporting element 8. The airbag module shown in FIG. 5, in contrast, has ordered "zigzag folding" and a two piece supporting element, like the airbag module illustrated in FIG. 3.

Figure 6:
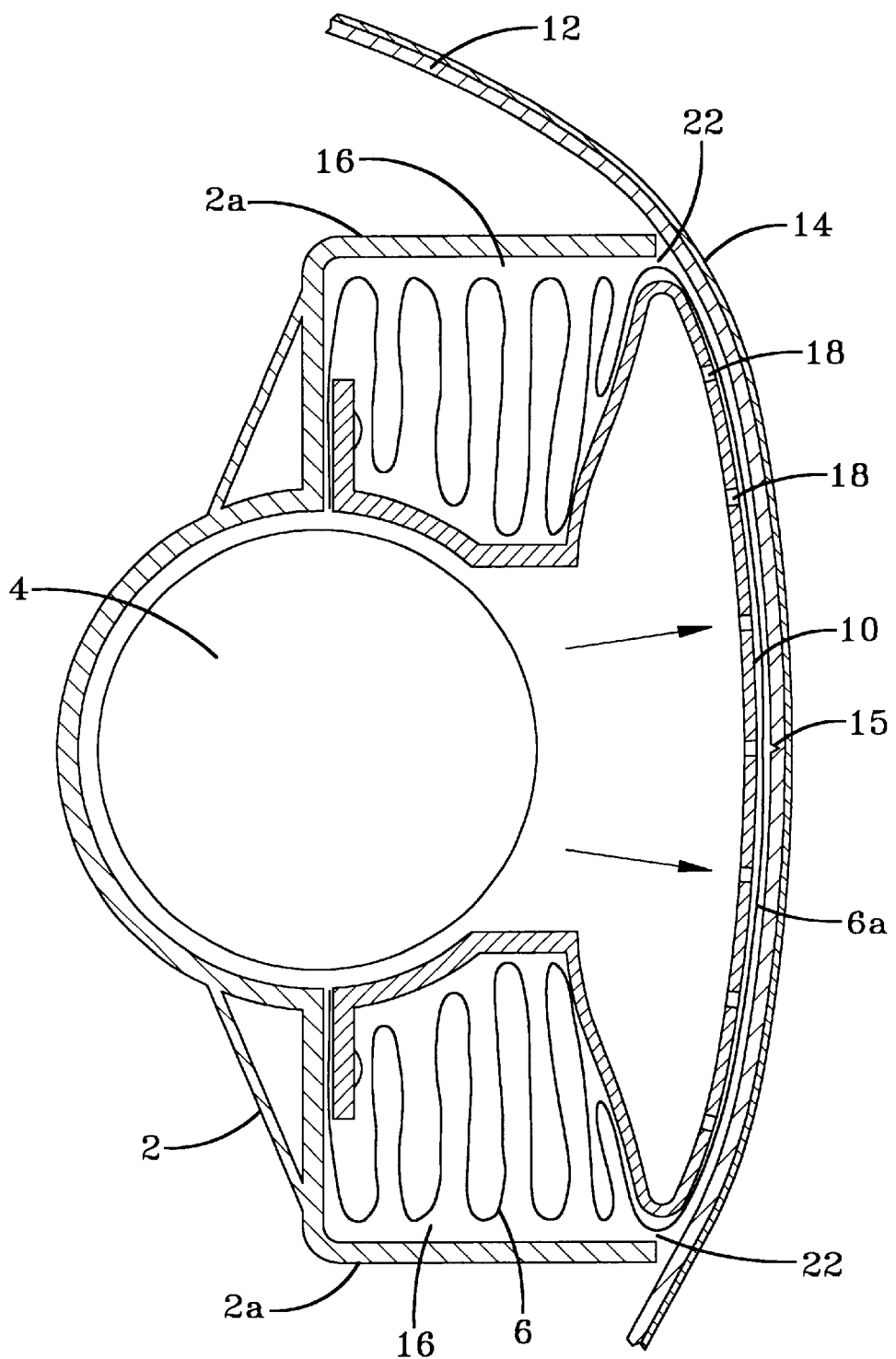
FIG. 6 is a cross section through a front passenger airbag module according to the invention.

FIG. 6 shows another embodiment of the airbag module according to the invention. This airbag module is an airbag module that is fitted on the front passenger side of a vehicle. This airbag module also has a gas generator 4 which is clamped between the gas generator support 2 and the supporting element 8, the supporting element having an essentially mushroom shaped cross section as in the embodiment shown in FIGS. 1 and 2. This makes it possible to dispense with additional fastening elements and the number of assembly steps required can be reduced. A forward portion 6a of the airbag 6 extends over the front surface 10 of the supporting element 8, which faces a vehicle interior. Arranged above it are a foam layer 12 and a cover layer 14. The remaining part of the airbag 6 is arranged in the free lateral areas 16 at the circumference of the supporting element, behind the front surface 10.

In contrast to the embodiments shown in FIGS. 1 and 3, the foam layer 12 and the cover layer 14 are part of the vehicle interior trim, i.e. they extend beyond the surface of the airbag module. The foam layer and the cover layer form, for example, a seamless cover over the entire instrument panel support. The gas generator support 2 has side walls 2a that extend to the side of the airbag module, as far as the foam layer 12. The gas generator support 2 thus forms a housing that, together with the foam layer with the cover layer, completely surrounds the airbag module. This embodiment has the advantage that the airbag module and, in particular, the forward portion 6a of the airbag 6 are arranged directly behind a seamless surface layer of the vehicle interior trim. This allows extremely rapid deployment of the airbag 6.

During airbag deployment, gas generated by the gas generator 4 produces a pressure within the supporting element 8, the gas flowing into the airbag 6 via the holes 18. During this process, the forward portion 6a of the airbag presses against the foam layer 12, which in turn presses against the cover layer 14. In this arrangement, the cover layer and the foam layer can tear easily along the predetermined tearing line 15, allowing the airbag 6 to deploying rapidly into the vehicle interior. The supporting element 8 will be deformed in a manner similar to that shown in FIG. 2, with the result that the gap 22 at the periphery of the front surface 10 is widened and even the part of the airbag 6 which is folded in the lateral area 16 can deploy rapidly. The gap 22 preferably has a width that allows a single layer of the airbag 6 to quickly pass through the gap, but prevents the complete folded airbag packet from passing through the gap. This ensures that the airbag is successively inflated beginning from the forward portion so that the already inflated forward portion 6a of the airbag forms a completely inflated cushion providing sufficient protection for a vehicle occupant at any stage of the inflation process. The remaining parts of the airbag 6 stored and folded behind the front surface 10 are pulled out successively when the airbag is further inflated. Thus, the airbag is inflated similar to a balloon.

This embodiment has the advantage that the stable external form of the vehicle interior trim in the region of the airbag module is ensured by the supporting element 8 and, in particular, by the design of its front surface 10, making it possible to dispense with additional rigid shape imparting cover elements over the airbag module. This makes it possible to ensure more rapid and easier opening of the covering of the airbag module, thus allowing the airbag to be deployed more rapidly and more gently into the vehicle interior. Improved protection for the vehicle occupants is thus ensured.

Figure 7:
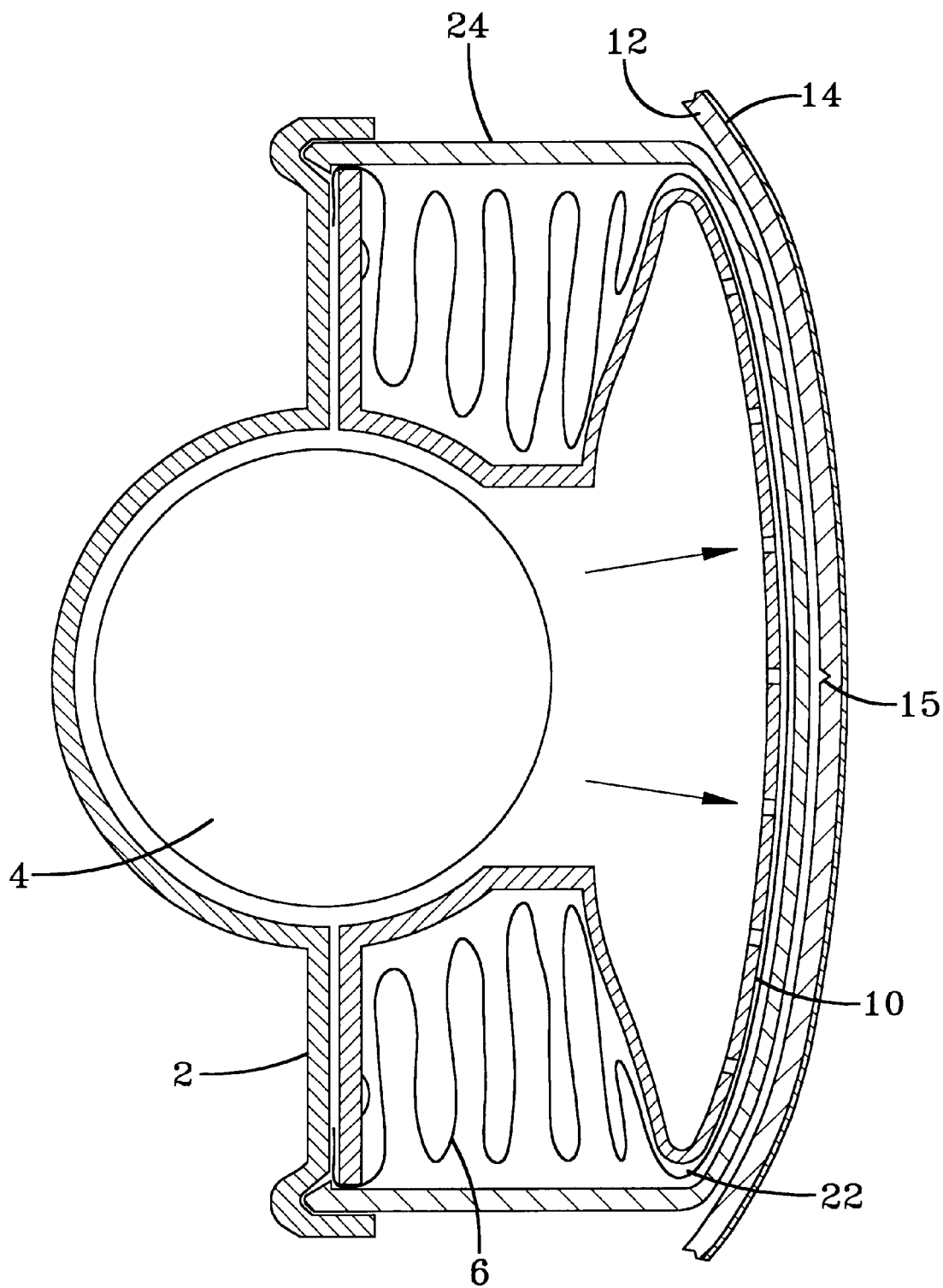
FIG. 7 is a cross section through a front passenger airbag module according to the invention in accordance with a second embodiment.

The airbag module shown in FIG. 7 corresponds essentially to the airbag module illustrated in FIG. 6 and therefore only the differences are described in detail. In addition to the airbag module shown in FIG. 6, the airbag module in accordance with FIG. 7 has a sleeve 24 which is secured on the gas generator support 2 and on the supporting element 8 and, together with the gas generator support, securely encloses the airbag module. This makes it possible to prevent damage to the airbag module and, in particular, to the airbag 6 before and during installation of the airbag module in a vehicle. The sleeve 24 is designed as a cap or hood, made from a rubber like material, which is secured by latching on the gas generator support 2 and the supporting element 8, this being shown in more detail in FIG. 8. On the front side of the airbag module, the sleeve 24 lies between the airbag 6 and the foam layer 12 of the interior trim. Like the foam layer 12 and the cover layer 14, the sleeve 24 also preferably has predetermined tearing points (not shown here) which allow it to tear open in a controlled manner as the airbag is deployed.

Figure 8:
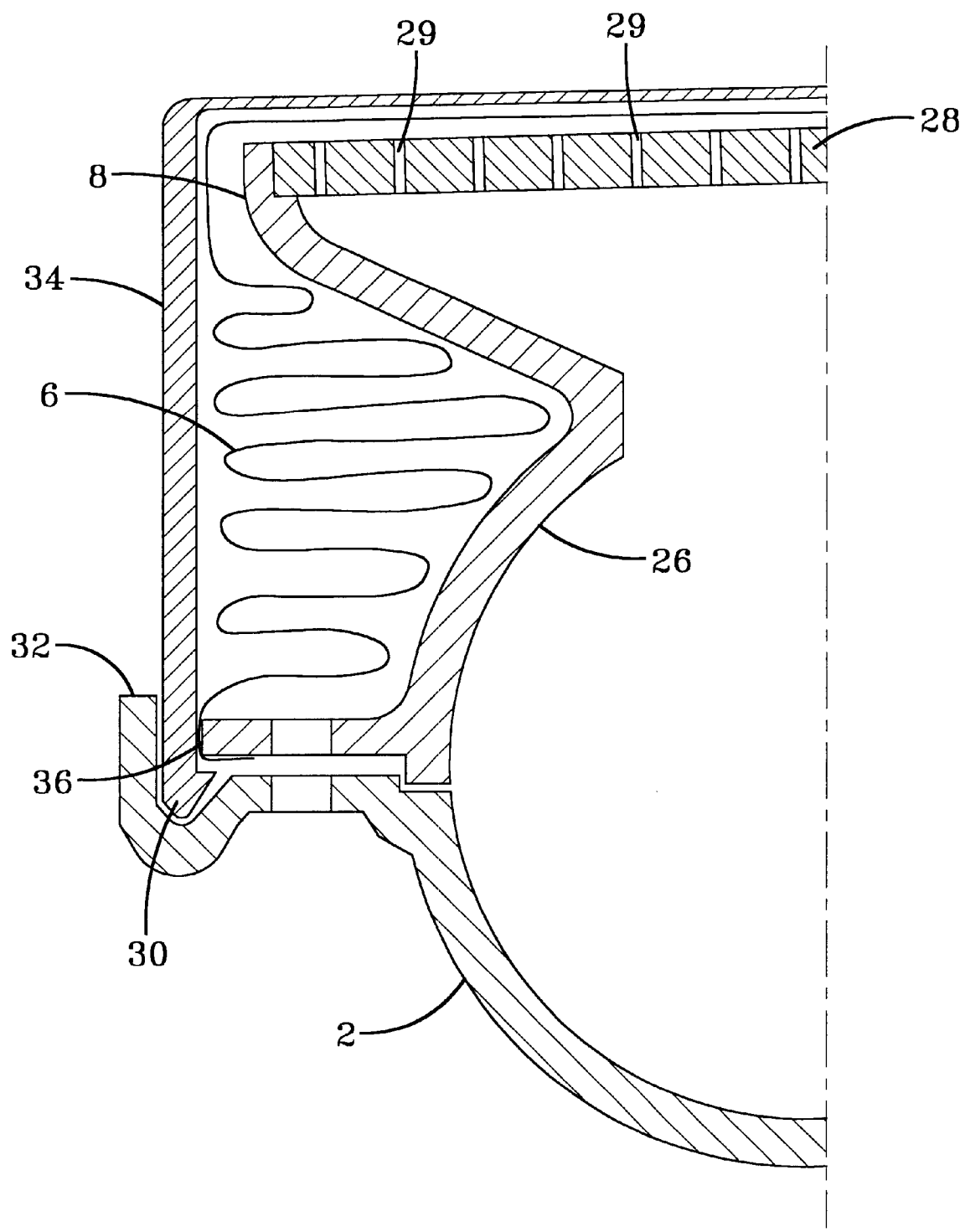
FIG. 8 is a cross section through an airbag module according to the invention.

FIG. 8 is a detailed view of an airbag module according to the invention. The supporting element 8 is a two part plastic component. A front panel 28 matched to the vehicle interior trim and provided with holes 29 to allow gas to flow therethrough is inserted on the front side into a main body 26 of the supporting element 8, which is secured on the gas generator support 2. The front panel corresponds in function to the front surface 10 of the embodiments described above. For example, the main body and the front panel can both be injection molded plastic and welded to one another.

FIG. 8 shows the sleeve 24 described above secured on the gas generator support 2 and the supporting element 8. The sleeve 24 is designed as a box shaped hood that has inward pointing hooks 30 at its free circumference, along its opening. These hooks reach behind that portion of the supporting element that rests against the gas generator support. The sleeve 24 is held fast on the supporting element 8 and thus on the entire airbag module. The gas generator support 2 has a rim 32 which extends parallel to the side walls 34 of the sleeve and forms a gap together with the circumferential edge 36 of the supporting element, behind which the hook 30 reaches. The sleeve 24 engages in this gap. In this arrangement, the preferably encircling rim 32 prevents the free ends of the sleeve from moving outward with the hooks 30 and coming away from the edge 36.

Figure 9:
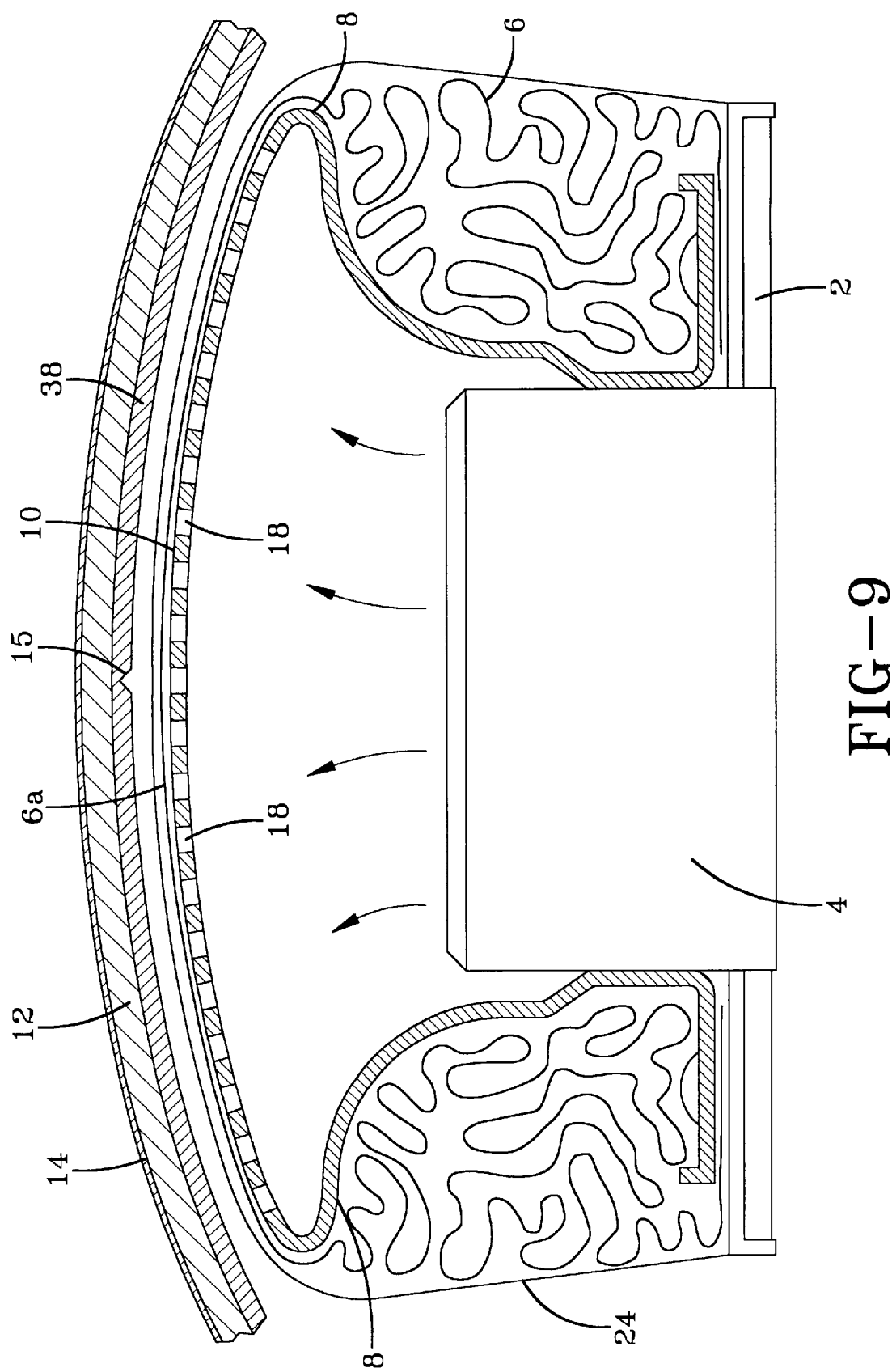
FIG. 9 is a cross section of an airbag module according to the invention similar to that shown in FIG. 4.

FIG. 9 shows a further embodiment of the invention similar to the embodiment shown in FIG. 4. The only difference between the embodiment shown in FIG. 4 and the embodiment shown in FIG. 9 is an additional support layer 38 that is arranged under the cover film 14 and the foam element 12. The support layer 38 may comprise a thin and lightweight sheet or panel that during airbag deployment will have a minimum inertia to avoid injuring a vehicle occupant. It is the function of the support layer 38 to support the cover film 14 so that the cover film is always tight without wrinkles. Thus the support layer ensures a smooth surface of the cover film in any condition, e.g. when it is exposed to sunlight. Further, mounting the cover film is simplified by the support layer. The support layer 38 advantageously comprises tearing points at the position of the tearing points 15 to allow an easy opening of the support layer 38 so that the airbag 6 can enter the interior of the vehicle.

Figure 10:
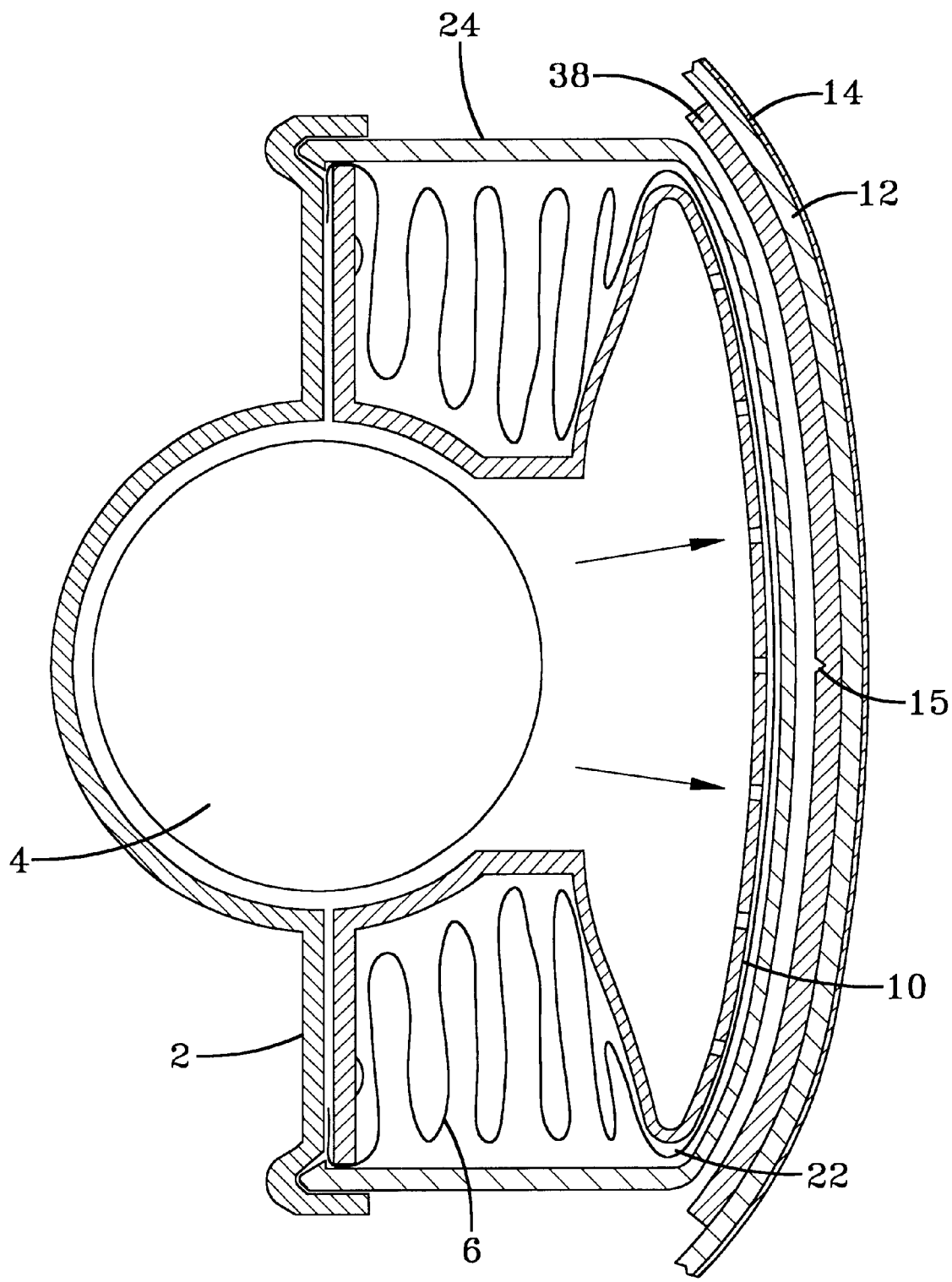
FIG. 10 is a cross section of an airbag module according to the invention similar to that shown in FIG. 7.

FIG. 10 shows a further embodiment similar to the embodiment shown in FIG. 7. In this embodiment an additional support layer 38 is arranged under the cover film 14 and the foam element 12. The function of the support layer shown in FIG. 10 is identical with the support layer 38 discussed above with reference to FIG. 9. In FIGS. 9 10, a foam element 12 is arranged between the support layer 38 and the cover film 14. However, the foam element 12 may be omitted in preferred embodiments, e.g. in embodiments similar to FIG. 8. Further, although the additional support layer 38 has been explained with reference to embodiments similar to the embodiments shown in FIGS. 4 and 7, an additional support layer may also be provided in one of the other preferred embodiments discussed above.

It is understood that the invention is not limited to the particular construction and arrangement of parts herein illustrated and described, but embraces such modified forms thereof as come within the scope of the following claims.

We claim:

1. An airbag module comprising an airbag and a gas generator, wherein a supporting element is arranged in such a way between the gas generator and the airbag in the direction of unfolding of the airbag that when folded up, a portion of the airbag which is at the front in the direction of unfolding rests essentially flat against a front surface of the supporting element, wherein the supporting element is a cage that tapers inwardly from the front side of the airbag module to the gas generator and surrounds the gas generator; wherein at least the front surface of the supporting element is deformable in such a way that as the airbag is inflated said front surface bulges in the direction of the deployment of the airbag and the radius of curvature of said supporting element decreases.

2. The airbag module as claimed in claim 1 wherein the supporting element is gas-permeable, at least at its front surface.

3. The airbag module as claimed in claim 2 wherein the front surface of the supporting element, against which surface the airbag rests, extends essentially along the entire front side of the airbag module.

4. The airbag module as claimed in 1 wherein at least the forward portion of the airbag, which rests against the front surface of the supporting element is covered toward an outside, when folded up, by a cover layer.

5. The airbag module according to claim 4 wherein the cover layer is part of the surface of a vehicle interior trim.

6. The airbag module according to claim 4 wherein a support layer is arranged between the cover layer and the forward portion of the airbag.

7. The airbag module as claimed in claim 4 wherein the cover layer completely encloses the airbag module and is secured on the gas generator or a gas generator support.

8. The airbag module as claimed in claim 4 wherein a foam body is arranged between the cover layer and the airbag.

9. The airbag module as claimed in claim 4 wherein the cover layer is provided with predetermined tearing points.

10. The airbag module as claimed in claim 1 wherein the supporting element is secured to the gas generator or a gas-generator support.

11. The airbag module as claimed in claim 1 wherein the folded-up airbag is arranged essentially laterally with respect to the gas generator to the outside of the supporting element and behind the front surface of the supporting element in the direction of deployment of the airbag.

12. The airbag module as claimed in claim 1 wherein the supporting element is of one piece-design.

13. The airbag module as claimed in claim 1 wherein the supporting element comprises a plurality of parts.

* * * * *